United States Patent [19]

Sennewald

[11] Patent Number: 4,930,262
[45] Date of Patent: Jun. 5, 1990

[54] CONTROL SYSTEM FOR SURFACE GRINDING OF LIKE WORKPIECE BLANKS

[75] Inventor: Jürgen Sennewald, Solingen, Fed. Rep. of Germany

[73] Assignee: Maschinenfabrik Ernst Thielenhaus GmbH, Wuppertal, Fed. Rep. of Germany

[21] Appl. No.: 283,606

[22] Filed: Dec. 13, 1988

[30] Foreign Application Priority Data

Dec. 19, 1987 [DE] Fed. Rep. of Germany ....... 3743275

[51] Int. Cl.$^5$ ............................................. B24B 49/00
[52] U.S. Cl. ............................. 51/165.74; 51/165.76; 51/129
[58] Field of Search ........... 51/165.71, 165.74, 165.76, 51/129, 131.1, 131.3, 133, 134

[56] References Cited

U.S. PATENT DOCUMENTS 2,840,957 7/1958 Warden et al. .................. 51/165.76

OTHER PUBLICATIONS

JP Abstract 58-22659 2/10/83, Masao.

Primary Examiner—Frederick R. Schmidt
Assistant Examiner—M. Rachuba
Attorney, Agent, or Firm—Herbert Dubno

[57] ABSTRACT

In the control process for surface grinding a measuring sensor of a stationary electronic measuring unit with a memory determines the actual heights of a group of workpiece blanks in a precision grinding machine on workpiece mounts on a switchable spindle head relative to a reference point on the appropriate spindle. To avoid thickness errors due to tolerance-dependent variations of the workpiece mounts at least one reference workpiece of an accurately predetermined thickness is placed on the individual workpiece mounts, and is measured in the same way as the workpiece blanks. Height measurements of the reference workpiece are made on the workpiece mounts relative to the reference points and are fed to the memory as setpoint values. Then the measuring unit compares the actual height values of the workpiece blanks on the workpiece mounts with the setpoint values in the memory for these particular workpiece mounts and according to the difference between both actual and setpoint values controls the surface grinding.

3 Claims, 2 Drawing Sheets

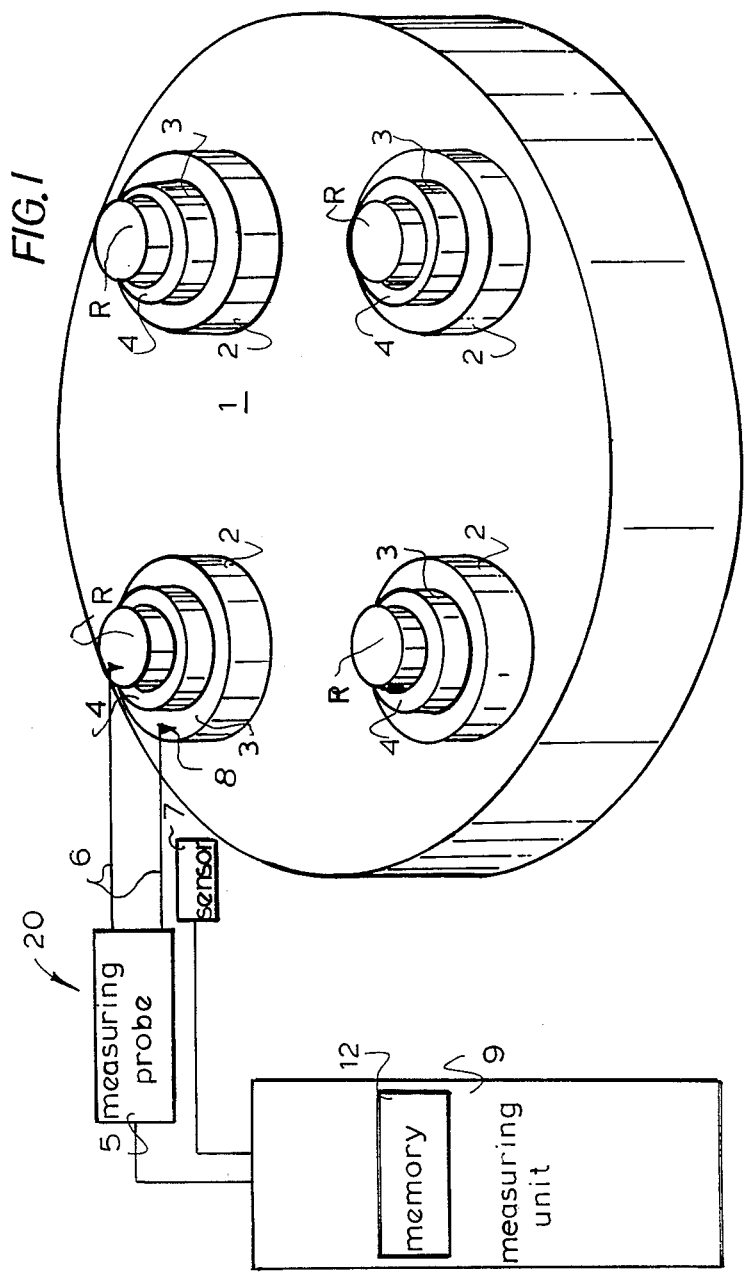

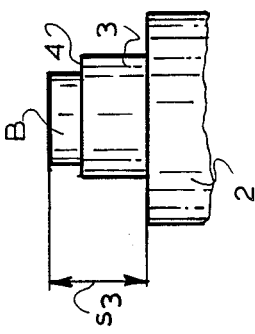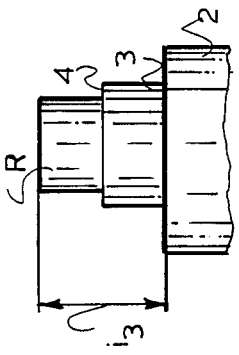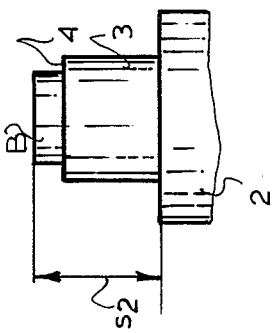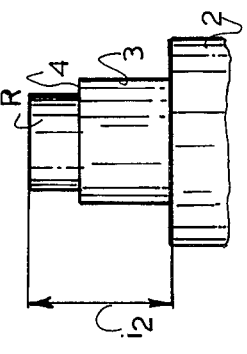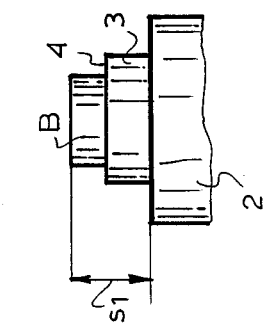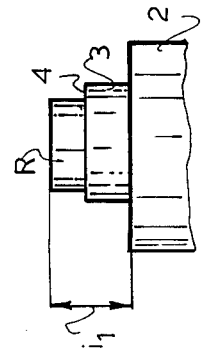

CONTROL SYSTEM FOR SURFACE GRINDING OF LIKE WORKPIECE BLANKS

FIELD OF THE INVENTION

My present invention relates to a process and apparatus for controlling the surface grinding of substantially like workpiece blanks, and, more particularly, to a control system for the surface-grinding operation.

BACKGROUND OF THE INVENTION

A control apparatus which controls the surface grinding of a plurality of substantially like workpieces to a predetermined accuracy in a precision grinding machine, which has a plurality of spindles with a workpiece receiving component and a workpiece mount in a switchable spindle head, is known.

This control apparatus comprises a measuring sensor and an electronic measuring unit, with which the measuring sensor determines the actual height value of the workpiece blank to be worked on the workpiece mount relative to a reference point on the appropriate spindle. The actual height value is fed to the measuring unit. The measuring unit controls the surface grinding considering the actual height value.

The workpiece blank can be metal, hard metal, ceramic material and/or plastic material. The workpiece blanks have tolerance-dependent thickness variations. They must be ground exactly within narrow tolerances and simultaneously are brought to a predetermined thickness.

"Switchable" in regard to the spindle heads means that the spindles on it are moved in the operating cycle from a loading station past a measuring station and one or more processing (grinding) stations of the unloading station. Generally the spindles rotate with the workpiece receiving components (seats, collets or chucks).

In the current control process used in practice and on which the invention is based, the workpiece receiving components and thus their mounts are carefully set up so that the surface of the workpiece receiving components, i.e. the workpiece mounts, seats, chucks or collets have a predetermined spacing relative to the reference point on the spindle which is equal for all spindles and is considered equal by the measuring unit from spindle to spindle. Consequently the grinding tool can be controlled in operation according to the actual height value relative to the reference point to adjust the workpiece to a predetermined thickness.

In fact the principal replaceable workpiece receiving components are very unequal because of basic tolerances even if they are made with the utmost care. These height precision variations are not considered in the current control process and lead to thickness errors in the worked workpiece. If the workpiece receiving component is higher than the constant value of its height stored or fed to the measuring unit, then the workpiece is made too thin. In the reverse situation it is too thick, i.e. when the workpiece receiving component is lower than the corresponding constant value.

OBJECTS OF THE INVENTION

The main object of the invention, therefore, is to provide an improved method of an apparatus for the control of surface grinding which will overcome these drawbacks.

It is another object of my invention to provide an improved control system including a control process and/or apparatus for surface grinding of workpiece blanks in which tolerance-dependent height errors in the workpiece receiving components no longer generate errors in the thickness of the workpiece to be worked.

SUMMARY OF THE INVENTION

Thse objects and others which will become more readily apparent hereinafter are attained in accordance with my invention in a control process and apparatus for surface grinding of workpiece blanks as described above.

According to my invention the measuring unit is provided with at least one reference workpiece of an accurately predetermined thickness which is geometrically similar to the workpiece blank to be worked and which rests on a respective individual workpiece mount and is measured in a way which is substantially the same as the measurement of the workpiece blanks.

The measuring unit has a memory in which a plurality of height measurements of the reference workpiece or workpieces on a corresponding plurality of individual workpiece mounts are fed as setpoint values. The measuring unit compares the actual height values of the workpiece blanks measured on the same individual workpiece mounts with the setpoint values fed to the memory for these individual workpiece mounts. According to the difference between the actual values of the workpiece blank heights, the measuring unit and the setpoint values of the height controls the surface grinding of the workpiece blanks. The described measurement is performed anew when the workpiece receiving components, for example, because a workpiece change is effected, are replaced.

Advantageously the number of reference workpiece measurements which are stored in the memory of the measuring unit corresponds to the number of workpiece mounts on the spindle head or to the number of spindles.

By "accurately predetermined thickness" I mean that the thickness of the reference workpiece is known at least to the desired degree of accuracy that is required of the final worked or processed workpiece blank.

In the control process, variation in heights and/or lengths of the spindles protruding beyond the spindle head has also not been generally considered because the measuring unit operates the tool performing the grinding process in the described way when this tool is applied to the workpiece surface. However, one can consider variation in heights and/or lengths of the spindles above the spindle head within the framework of my invention and of course basically in the way described above with an additional reference point on the provided spindle head.

BRIEF DESCRIPTION OF THE DRAWING

The above and other objects, features and advantages of my invention will become more readily apparent from the following description, reference being made to the accompanying highly diagrammatic drawing in which:

FIG. 1 is a top perspective view of a spindle head for a control apparatus for surface grinding of like workpiece blanks according to the invention;

FIGS. 2a-2c are diagrams illustrating part of the control process according to my invention with a reference workpiece; and FIGS. 3a-3c are diagrams of another portion of the control process according to my invention with a workpiece blank.

SPECIFIC DESCRIPTION

FIG. 1 shows a section of a precision grinding machine. This section has a switchable spindle head 1, a plurality of spindles 2 each with a workpiece receiving component 3 and a workpiece mount 4 with the mounted workpiece blank R on the individual workpiece mounts.

In this arrangement the spindle head 1 carries four spindles 2.

The switching of the spindle head 1 is effected in a processing cycle so that all spindles 2 can be loaded at a loading station (not shown) and can be unloaded at an unloading station while a measuring station and a processing (grinding) station are available. The spindle head 1 is integrated in a control apparatus for surface grinding of substantially like metal workpiece blanks R to predetermined tolerances in the precision grinding process.

FIG. 1 shows a measuring probe 5 with a measuring sensor 6 and a spindle sensor 7. The spindle sensor 7 which is stationary determines which spindle 2 is at the measuring sensor 6 in the measuring station 20 and as a result at which spindle 2 the measurement is being performed.

The measuring sensor 6 determines the actual height value of the workpiece blank R to be processed on the workpiece mount 4 relative to a reference point 8 of the corresponding spindle 2.

Moreover as shown in FIGS. 3a-3c the measuring sensor 6 contacts the different workpiece blanks R on the different workpiece mounts 4. For simplification only three spindles have been identified. The actual height values $i_1$, $i_2$ and $i_3$ were recorded. A measuring unit 9 is also shown in FIG. 1. The actual height values $i_1$, $i_2$, $i_3$ are fed to the measuring unit 9. Besides the arrangement is designed so that in processing the workpieces the measuring unit 9, which receives certain actual height values, controls the processing tool according to these actual height values to provide the finished processed workpieces with a predetermined thickness to narrow tolerances.

FIGS. 2a-2c illustrate the process of my invention and show the spindles 2 and the workpiece receiving components 3. The measuring unit 9 however acts on a reference workpiece B of an accurately predetermined thickness corresponding geometrically to the workpiece blank to be worked. In all of FIGS. 2a-2c the same reference workpiece B may be placed on the workpiece mounts 4.

Now a measurement is effected as already described in regard to the workpiece blank R. Here the measurement leads to the height measured values $s_1$, $s_2$ and $s_3$. The measuring unit 9 has a memory 12 in which the height measuring values of the reference workpiece B on the individual workpiece mounts 4 relative to the reference point 8 are fed as setpoint or desired values $s_1$, $s_2$ and $s_3$.

The measuring unit 9 compares the actual height values $i_1$, $i_2$ and $i_3$ of the workpiece blanks R on the workpiece mounts 4 with the height setpoint values $s_1$, $s_2$ and $s_3$ supplied for this workpiece mount 4.

According to the difference between both these values the processing tool is controlled to work the workpieces. In the drawing the thickness variations and/or the height variations have been exaggerated to make the illustration of my control process more easily understood.

By the "shape of the reference workpiece and the workpiece blank" being "the same" in the following claims I mean that except for the small variation in shape due to tolerance errors or height errors the shape of both the reference workpiece and the workpiece blank is the same. Thus, exactly the same operations can be used to measure both items.

I claim:

1. In a control process for surface grinding of a plurality of substantially like workpiece blanks to a predetermined accuracy in a precision grinding machine, which has a plurality of spindles each with a workpiece receiving component and a workpiece mount on a switchable spindle head, said control process having a control apparatus comprising a measuring sensor and an electronic measuring unit, in which said measuring sensor determines an actual height value of a workpiece blank to be worked relative to a reference point of the appropriate one of said spindles and in which said actual height value is fed to said measuring unit and said measuring unit controls said surface grinding considering said actual height value, the improvement wherein said measuring unit is associated with at least one reference workpiece of a predetermined thickness being geometrically similar to said workpiece blanks to be worked which rests on individual ones of said workpiece mounts and is measured in substantially the same way on each of said workpiece mounts as said workpiece blanks, said measuring unit has a memory to which a plurality of height measurements of said reference workpiece for said individual workpiece mounts relative to said reference points are fed as setpoint values and said measuring unit compares said actual height values of said workpiece blanks on said workpiece mounts with said setpoint values fed to said memory for said individual workpiece mounts and according to the difference between said actual height values and said setpoint values controls said surface grinding of said workpiece blanks, and wherein said measuring unit additionally detects variation in length of said spindles relative to said spindle head.

2. The improvement defined in claim 1 in which said plurality of said height measurements of said reference workpiece or workpieces corresponds to the number of said spindles and/or said workpiece mounts on said spindle head.

3. A control process for controlling the surface grinding of a plurality of substantially similar workpiece blanks to a predetermined accuracy in a precision grinding machine, which has a plurality of spindles each with a workpiece receiving component and a workpiece mount on a switchable spindle head, said controlling process comprising the steps of:

(a) measuring the heights of at least one reference workpiece having an accurately predetermined thickness and being substantially geometrically similar to said workpiece blanks relative to a reference point on an appropriate one of said spindles, said reference workpiece being mounted on individual ones of said workpiece mounts associated with different ones of said spindles;

(b) determining actual height values of said workpiece blanks on said individual workpiece mounts;

(c) comparing said actual height values of said workpiece blanks and said heights of said reference workpiece on said workpiece mounts;
(d) detecting variations in length of said spindles relative to said spindle head; and
(e) working said workpiece blanks according to the difference between said actual height values of said workpieces and said heights for said reference workpiece, and according to said variations in said length of said spindles relative to said spindle head.

* * * * *